(12) United States Patent
Smetana et al.

(10) Patent No.: US 8,979,695 B2
(45) Date of Patent: Mar. 17, 2015

(54) DRIVE DEVICE COMPRISING AN ELECTRIC MACHINE

(75) Inventors: Thomas Smetana, Herzogenaurach (DE); Thorsten Biermann, Wachenroth (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/111,490

(22) PCT Filed: Mar. 12, 2012

(86) PCT No.: PCT/EP2012/054211
§ 371 (c)(1),
(2), (4) Date: Nov. 18, 2013

(87) PCT Pub. No.: WO2012/139832
PCT Pub. Date: Oct. 18, 2012

(65) Prior Publication Data
US 2014/0080653 A1    Mar. 20, 2014

(30) Foreign Application Priority Data

Apr. 13, 2011    (DE) .......................... 10 2011 007 259

(51) Int. Cl.
*F16H 3/54*     (2006.01)
*B60K 1/00*     (2006.01)
*B60K 17/02*    (2006.01)
*F16H 48/11*    (2012.01)
*F16H 48/10*    (2012.01)

(52) U.S. Cl.
CPC .. *F16H 3/54* (2013.01); *B60K 1/00* (2013.01); *B60K 17/02* (2013.01); *B60K 2001/001* (2013.01); *F16H 48/11* (2013.01); *F16H 2048/106* (2013.01); *F16H 2200/0021* (2013.01); *F16H 2200/0034* (2013.01); *F16H 2200/2035* (2013.01)
USPC .......... 475/150; 475/322; 475/317; 192/48.91

(58) Field of Classification Search
USPC ........................ 475/150, 322, 317; 192/48.91
See application file for complete search history.

(56) References Cited

U.S. PATENT DOCUMENTS

| 4,479,404 | A   |   | 10/1984 | Stockton |         |
|-----------|-----|---|---------|----------|---------|
| 4,702,125 | A   |   | 10/1987 | Kalns    |         |
| 5,690,578 | A   | * | 11/1997 | Hall, III | ......................... 475/269 |
| 7,247,117 | B2  | * | 7/2007  | Forster  | ........................... 475/221 |
| 7,351,178 | B2  | * | 4/2008  | Keuth    | ........................... 475/204 |

(Continued)

FOREIGN PATENT DOCUMENTS

| CN | 201 672 014 | 12/2010 |
|----|-------------|---------|
| CN | 201672012   | 12/2010 |

(Continued)

*Primary Examiner* — Derek D Knight
*Assistant Examiner* — David Morris
(74) *Attorney, Agent, or Firm* — Davidson, Davidson & Kappel, LLC

(57) ABSTRACT

A drive device (1, 20) including an electric machine (3), a first planetary gear (4), a differential (5) and an operative connection between a drive shaft (3a) of the electric machine (3) and a first planetary pinion (4a) of the first planetary gear (4), said first planetary pinion (4) engaging with the first planet wheels (4b) which engage with a stationary first ring gear (4) and which are rotationally mounted on a first planet carrier (4c) which is connected in a rotationally fixed manner to a differential cage (5a) of the differential.

13 Claims, 2 Drawing Sheets

(56) References Cited

U.S. PATENT DOCUMENTS

| | | | | |
|---|---|---|---|---|
| 7,468,014 | B2* | 12/2008 | Usoro | 475/5 |
| 2004/0138021 | A1 | 7/2004 | Stettler | |
| 2007/0049440 | A1* | 3/2007 | Raghavan et al. | 475/5 |
| 2010/0267508 | A1* | 10/2010 | Hvolka et al. | 475/149 |
| 2011/0165684 | A1 | 7/2011 | Thorn et al. | |

FOREIGN PATENT DOCUMENTS

| | | |
|---|---|---|
| DE | 19841159 | 1/2000 |
| JP | 5 332 408 | 12/1993 |
| KR | 20090127493 | 12/2009 |
| WO | WO 2009/067416 | 5/2009 |

\* cited by examiner

DRIVE DEVICE COMPRISING AN ELECTRIC MACHINE

The present invention relates to a drive device having an electric machine, a planetary gear, a differential, and an operative connection between a drive shaft of the electric machine and a first sun wheel of the first planetary gear, the first sun wheel being in toothed engagement with first planet wheels which are in toothed engagement with a stationary first annulus gear and are rotatably mounted on a first planet carrier, which is rotatably fixedly connected to a differential cage of the differential.

BACKGROUND

Such a drive device is described in DE 198 41 159 C2. The electric machine in the form of an electric motor is connected to a classic bevel differential gear with the aid of a simple planetary gear. The rotor shaft is provided with a toothing at the end which forms the sun wheel of the planetary gear. The differential cage of the bevel differential gear at the same time is the planet carrier for the planets of the planetary gear which are in toothed engagement with the sun wheel and a stationary annulus gear. The planet carrier is rotatable about the main axis of the drive device. The axle drive bevel gears of the differential are connected to output shafts to which the torques introduced into the differential are distributed via the compensating gears, starting from the planet carrier. Such drive devices have a very compact design and require little installation space.

SUMMARY OF THE INVENTION

It is an object of the present invention to create a drive device having a variable drive concept.

The present invention provides that the operative connection between the planetary gear and the drive shaft is a second planetary gear. The second planetary gear is formed by at least one second sun wheel, by a second set of planet wheels, by a second planet carrier, and by a second annulus gear. The input of the operative connection is the second sun wheel. The second sun wheel is rotatably fixedly connected to the drive shaft about the rotational axis of the drive shaft for this purpose and is in toothed engagement with the second planet wheels. The second set of planet wheels is rotatably mounted on planetary pins at a radial distance from the main axis of the drive device, the planetary pins being fixed on the second planet carrier.

The second planet wheels are in toothed engagement with the internal toothing of the second annulus gear, which may be held in a stationary manner. Within the meaning of the present invention, "may be held in a stationary manner" shall mean that the second annulus gear may be held rotatably fixedly with respect to a housing, for example a housing of the drive device, relative to the main axis of the drive device, but may also be enabled again so as to rotate about the main axis.

The second planet carrier of the second planetary gear and the first sun wheel of the first planetary gear are rotatably fixedly connected to each other about the rotational axis of the drive shaft. The first sun wheel is the input of the first planetary gear.

The rotational axis of the drive shaft is the main axis of the drive device which centrally extends axially through the drive device, and is thus also the rotational axis of the first planet carrier, of the second planet carrier, of the first annulus gear, and of the second annulus gear.

According to the present invention, an engageable and disengageable rotary joint is provided between the second sun wheel and the second annulus gear. When the rotary joint between the second sun wheel and the second annulus gear is engaged, a relative rotation of the annulus gear with respect to the sun wheel and a relative rotation of the sun wheel with respect to the annulus gear are precluded. The function of the second planetary gear is suspended. In this operating state, the rotational speeds and torques at the first sun wheel correspond to those at the drive shaft. When the rotary joint between the second sun wheel and the second annulus gear is disengaged, the further planetary gear is in effect. The rotational speeds and torques at the first sun wheel in this case deviate from those at the drive shaft due to the action of the second planetary gear.

Such a system according to the present invention allows the drive device to be operated in at least two operating states, making its use more variable.

One embodiment of the present invention provides for the second annulus gear to be fixable in a stationary manner with the aid of at least one brake. The brake is a disk or multi-disk brake, or a band brake, for example. Rotations of the second annulus gear may be decelerated with the aid of the brake from a maximum rotational speed to the rotational speed value of zero in relation to the surroundings.

A further embodiment of the present invention provides for the engageable and disengageable rotary joint between the second sun wheel and the second annulus gear to be producible with the aid of at least one clutch. The clutch is a multi-disk clutch, for example, or a synchronous clutch having conical friction rings. During engagement of the clutch, differences in the rotational speeds between the second annulus gear and the second sun wheel may be reduced from maximum values when the clutch is disengaged all the way to the relative rotational speed value of zero when the clutch is fully engaged.

The deceleration of the annulus gear is preferably accompanied by a synchronous disengagement of the clutch. The enabling of the annulus gear is accompanied by a synchronous engagement of the clutch, as is provided in one embodiment of the present invention. In this way, at least two operating states may be implemented, the brake being released synchronously with the clutch being engaged in a first operating state. In a second operating state, the clutch is disengaged synchronously with the brake being applied. Moreover, a third operating state is provided, in which both the clutch is disengaged and the annulus gear is enabled by the brake so as to be freely rotatable. In this operating state, no drive power is delivered to the differential.

The brake and the clutch may be operated separately and independently from each other using different operating devices.

One embodiment of the present invention provides for a joint operating device for the brake and the clutch, whereby the drive device, including the brake and the clutch, has a very compact and accordingly installation space-saving design. This operating device allows the brake and the clutch to be synchronously operated at the same time to shift the different operating states.

BRIEF DESCRIPTION OF THE DRAWINGS

The present invention will be described in greater detail hereafter based on two exemplary embodiments.

DETAILED DESCRIPTION

Figure 1:
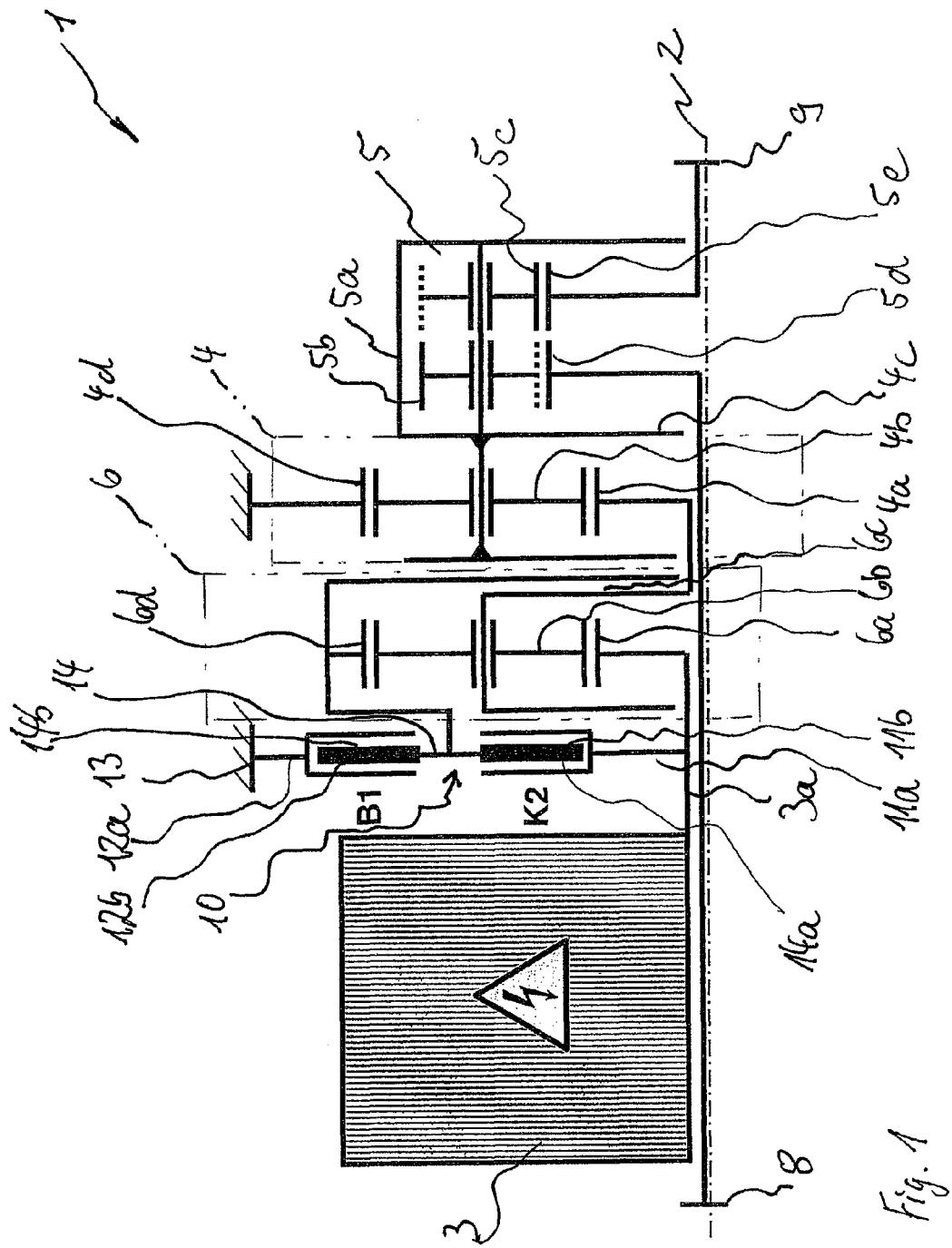
FIG. 1 shows a schematic illustration of a drive device 1 longitudinally along the main axis 2 of the drive device 1.

Drive device 1 includes an electric machine 3 and has a first planetary gear 4 and a differential 5. An operative connection is established via a second planetary gear 6 between a drive shaft 3a of electric machine 3, which is a rotor shaft 3a, and a first sun wheel 4a of first planetary gear 4.

First sun wheel 4a is in toothed engagement with first planet wheels 4b which are in toothed engagement with a stationary first annulus gear 4d and are supported thereon. Planet wheels 4b are rotatably mounted on a first planet carrier 4c.

Planet carrier 4c is rotatably fixedly connected to a differential cage 5a of differential 5, so that differential cage 5a may be rotatably driven about main axis 2 together with planet carrier 4c. Differential 5 is a planet differential in this case, whose differential cage 5a is a planet carrier 5a. However, as an alternative, the differential may also be a classic bevel differential gear having a differential cage, compensating gears and output wheels. Compensating gears 5b and 5c of the planet differential are formed by two sets of planet wheels 5b and 5c. In each case, a planet wheel 5b and a planet wheel 5c are in toothed engagement with each other. Moreover, planet wheels 5b are in toothed engagement with an output wheel 5d, which in planetary gear 5 is a sun wheel 5d, and planet wheels 5c are in toothed engagement with an output wheel 5e, which in planetary gear 5 is a sun wheel 5e. Sun wheels 5d and 5e are connected in each case to an output shaft 8 and 9. Output shaft 9 is oriented coaxially to main axis 2. Output shaft 8 is situated concentrically to rotor shaft 3a, so that its rotational axis corresponds to main axis 2.

Second planetary gear 6 is formed of a second sun wheel 6a, second planet wheels 6b, a second annulus gear 6d, and a second planet carrier 6c. Second sun wheel 6a is in toothed engagement with second planet wheels 6b. Planet wheels 6b are rotatably mounted on planet carrier 6c and are in toothed engagement with second annulus gear 6d. Second planet carrier 6c is connected to first sun wheel 4a. Second sun wheel 6a is rotatably fixedly connected to drive shaft 3a, so that second sun wheel 6a is rotatably driveable about main axis 2.

An engageable and disengageable rotary joint 10 is formed between second sun wheel 6a and second annulus gear 6d. Rotary joint 10 is composed of a clutch K2 and a brake B1. A first clutch element 11a is connected to sun wheel 6a in that first clutch element 11a is rotatably fixedly connected to drive shaft 3a and may be driven by the same. A second clutch element 11b is fixed concentrically to main axis 2 on second annulus gear 6d and is rotatably with the same about main axis 2 relative to first clutch element 11a. Clutch elements 11a and 11b may be connected to each other with the aid of an operating device, which is not shown in greater detail, in a form-locked and/or frictionally engaged manner, whereby the clutch K2 formed of clutch elements 11a and 11b is engageable. The form lock between clutch elements 11a and 11b may be suspended again by the operating device and clutch K2 may thus be disengaged.

Second annulus gear 6d may be held on a housing 13 in a stationary manner with the aid of a brake B1 so that it cannot be rotated about main axis 2. Brake B1 is formed of a first brake element 12a, which is fixed on housing 13, and a second brake element 12b, which is fixed on second annulus gear 6d rotatably about the main axis.

Second clutch element 11b and second brake element 12b are formed together on a disk 14 and have mutually concentric linings 14a and 14b.

In the system described at the outset, annulus gear 6d may be enabled by releasing brake B1, so that clutch K1 may be engaged and thus a rotatably fixed connection may be established between annulus gear 6d and sun wheel 6a. After clutch K1 has been disengaged, annulus gear 6d may be fixed with respect to the surroundings 16 with the aid of brake B1. These shifting processes are preferably seamless.

Figure 2:
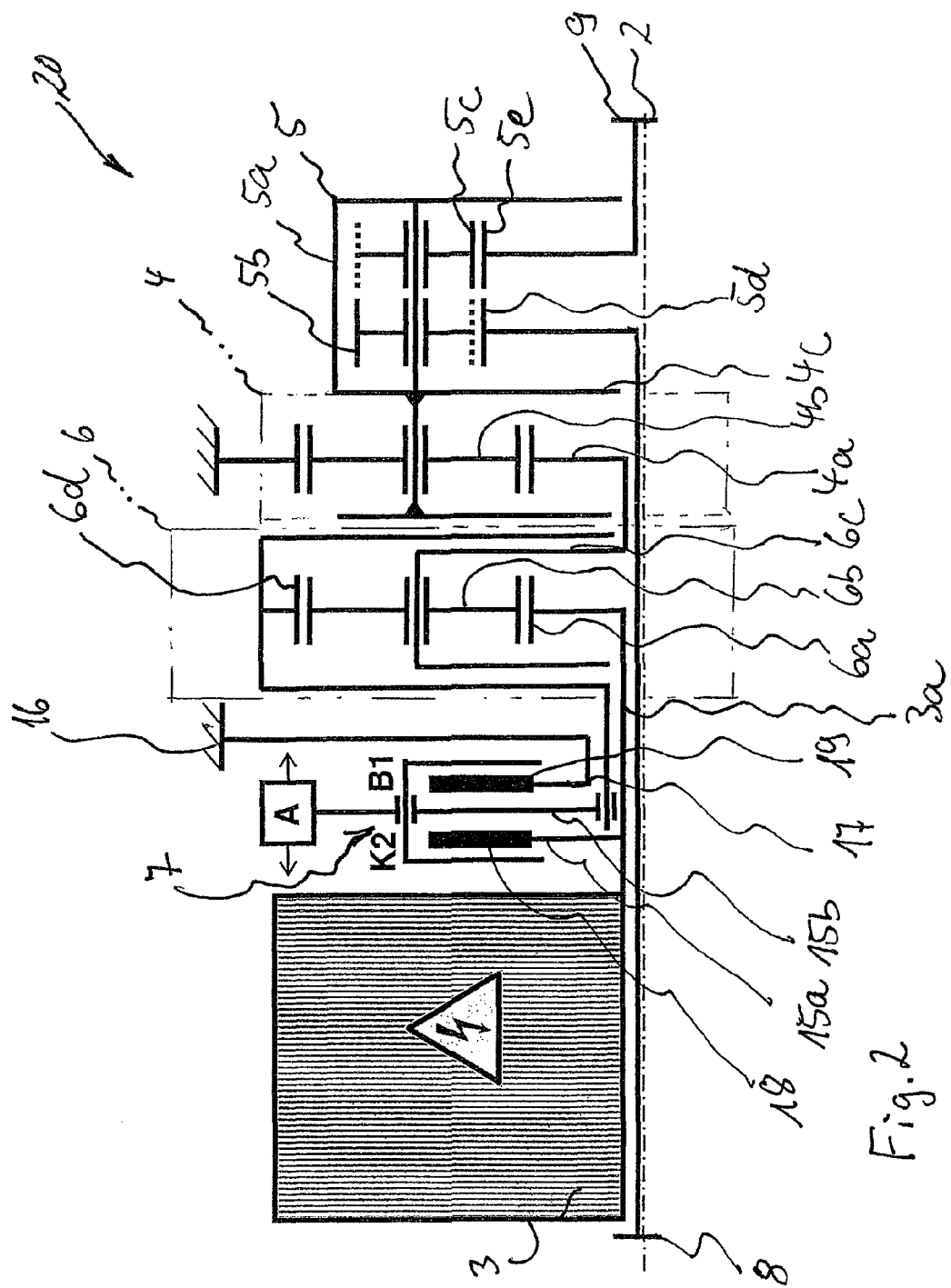
FIG. 2 shows a schematic illustration of a drive device 20 longitudinally along main axis 2 of drive device 20.

FIG. 2 shows a schematic illustration of a drive device 20 longitudinally along main axis 2 of drive device 20.

As drive device 1 according to FIG. 1, drive device 20 includes electric machine 3, first planetary gear 4, and differential 5. An operative connection is established via a second planetary gear 6 between a drive shaft 3a of electric machine 3, which is a rotor shaft 3a, and a first sun wheel 4a of first planetary gear 4. The design and the structure of drive devices 20 and 1 are identical regarding planetary gears 4 and 6 and differential 5. Drive device 20 differs from drive device 1 illustrated in FIG. 1 only by rotary joint 7.

Rotary joint 7 is engageable and disengageable and is formed between second sun wheel 6a and second annulus gear 6d. Rotary joint 7 is composed of a clutch K2 and a brake B1. A first clutch element 15a is connected to sun wheel 6a in that first clutch element 15a is rotatably fixedly connected to drive shaft 3a and may be driven by the same. A second clutch element 15b is at least rotatably fixed concentrically to main axis 2 on second annulus gear 6d, but is displaceable axially to this annulus gear and is rotatable with the same about main axis 2 relative to first clutch element 15a. Second clutch element 15b, which has a friction lining 18 situated concentrically to main axis 2, is illustrated in a neutral position. Clutch elements 15a and 15b are connectable to each other in a frictionally engaged manner with the aid of a linearly acting actuator A, whereby clutch K2 formed of clutch elements 15a and 15b is engageable upon movements of actuator A in the figure to the left. The frictional engagement between clutch elements 15a and 15b may be suspended again by movements of actuator A to the right side, and clutch K2 may thus be disengaged.

Second annulus gear 6d may be held in a stationary manner with respect to surroundings 16 with the aid of a brake B1 so that it is not rotatable about main axis 2. Brake B1 is formed of a brake element 17, which is fixed on surroundings 16, and second clutch element 15b, which is rotatably connected to second annulus gear 6d about main axis 2, but is axially displaceable relative to this annulus gear with the aid of actuator A. For a frictional engagement with the second clutch element, brake element 17 is provided with a friction lining 19 situated concentrically to main axis 2. The frictional engagement may be established by a movement of actuator A in the figure to the right, and thus by a displacement of second clutch element 15b to the right, and may be suspended again by a displacement to the left.

Due to the system described at the outset, clutch K1 is engaged, and synchronously therewith brake B1 is released, during a displacement of second clutch element 15b in the figure to the left, which means that a rotary joint is established between drive shaft 3a and thus second sun wheel 6a and annulus gear 6d, while brake B1, which has held annulus gear 6d on the surroundings, is released at the same time. Upon displacement of second clutch element 15b in the figure to the right, clutch K1 is disengaged, and synchronously therewith brake B1 is applied, which means that the rotary joint between annulus gear 6d and sun wheel 6a is suspended, and annulus gear 6d is fixed on the surroundings at the same time.

REFERENCE NUMERALS

| 1 | drive device |
| 2 | main axis |
| 3 | electric machine |
| 3a | drive shaft/rotor shaft |
| 4 | first planetary gear |
| 4a | first sun wheel |
| 4b | first planet wheel |
| 4c | first planet carrier |
| 4d | first annulus gear |
| 5 | differential |
| 5a | differential cage/planet carrier |
| 5b | compensating gear/planet wheel |
| 5c | compensating gear/planet wheel |
| 5d | output wheel/sun wheel |
| 5e | output wheel/sun wheel |
| 6 | second planetary gear |
| 6a | second sun wheel |
| 6b | second planet wheel |
| 6c | second planet carrier |
| 6d | second annulus gear |
| 7 | rotary joint |
| 8 | output shaft |
| 9 | output shaft |
| 10 | rotary joint |
| K1 | clutch |
| 11a | first clutch element |
| 11b | second clutch element |
| B1 | brake |
| 12a | first brake element |
| 12b | second brake element |
| 13 | Housing |
| 14 | Disk |
| 14a | Lining |
| 14b | Lining |
| K2 | Clutch |
| 15a | first clutch element |
| 15b | second clutch element |
| 16 | surroundings |
| A | Actuator |
| 17 | brake element |
| 18 | friction lining |
| 19 | friction lining |
| 20 | drive device |

The invention claimed is:

1. A drive device comprising:
an electric machine having a drive shaft;
a first planetary gear having a first sun wheel, first planet wheels, a first planet carrier and a stationary first ring gear;
a differential having a differential cage;
the drive shaft having an operative connection to the first sun wheel, the first sun wheel being in toothed engagement with the first planet wheels, the first planet wheels being in toothed engagement with the stationary first ring gear, the first planet wheels being rotatably mounted on the first planet carrier, the first planet carrier rotatably fixedly connected to the differential cage of the differential; and
a second planetary gear in the operative connection, having at least one second sun wheel rotatably fixedly connected to the drive shaft and in toothed engagement with second planet wheels, the second planet wheels being in toothed engagement with a second ring gear, the second ring gear being held in a stationary manner with the aid of a brake, the second planet wheels being rotatably mounted on a second planet carrier rotatably fixedly connected to the first sun wheel and an engageable and disengageable rotary joint between the second sun wheel and the second ring gear,
the rotary joint including a first clutch element connected to the second sun wheel, the first clutch element being rotatably fixedly connected to the drive shaft, the rotary joint including a second clutch element fixed concentrically with respect to and rotatable about a main axis of the drive shaft.

2. The drive device as recited in claim 1 wherein the brake is released synchronously with the clutch being engaged in a first operating state.

3. The drive device as recited in claim 1 wherein the clutch is disengaged synchronously with the brake being applied in a second operating state.

4. The drive device as recited in claim 1 wherein the brake includes a first brake element is fixed on a housing and a second brake element fixed on the second ring gear, rotatably about the main axis, the second clutch element and the second brake element being formed together on a disk and having mutually concentric friction linings.

5. The drive device as recited in claim 4 further comprising a shared actuator for the brake and the clutch, the shared actuator aiding synchronous operation of the brake and the clutch at the same time in at least one operating state.

6. The drive device as recited in claim 1 further comprising an output shaft situated concentrically to the drive shaft such that a rotational axis of the output shaft corresponds to the main axis.

7. The drive device as recited in claim 1 wherein the differential is a planetary differential and the differential cage is a further planet carrier.

8. The drive device as recited in claim 7 wherein the planetary differential includes a first set further planet wheels and a second set of further planet wheels.

9. The drive device as recited in claim 8 wherein the planetary differential includes a further sun wheel and an output wheel, the first set of further planet wheels being in toothed engagement with the output wheel.

10. The drive device as recited in claim 1 wherein the second clutch element has a friction lining situated concentrically to the main axis.

11. The drive device as recited in claim 10 wherein the first and second clutch elements are connectable to each other in a frictionally engaged manner by a linearly acting actuator.

12. The drive device as recited in claim 11 wherein the brake includes a fixed brake element having the friction lining situated concentrically to the main axis.

13. The drive device as recited in claim 12 wherein the second clutch element is axially displaceable by the actuator to alternately contact the first clutch element or the fixed brake element.

* * * * *